United States Patent
Piwczyk (10) Patent No.: US 6,423,928 B1
(45) Date of Patent: Jul. 23, 2002

(54) GAS ASSISTED LASER CUTTING OF THIN AND FRAGILE MATERIALS

(75) Inventor: Bernhard P. Piwczyk, Dunbarton, NH (US)

(73) Assignee: ASE Americas, Inc., Billerica, MA (US)

( * ) Notice: Subject to any disclaimer, the term of this patent is extended or adjusted under 35 U.S.C. 154(b) by 0 days.

(21) Appl. No.: 09/690,161

(22) Filed: Oct. 12, 2000

(51) Int. Cl.$^7$ .......................... B23K 26/38; B23K 26/14
(52) U.S. Cl. ......................... 219/121.67; 219/121.72; 219/121.84
(58) Field of Search ............... 219/121.84, 121.67, 219/121.72; 239/597, 601; 372/701

(56) References Cited

U.S. PATENT DOCUMENTS

| | | | |
|---|---|---|---|
| 3,651,505 A | 3/1972 | Schmidt | 340/200 |
| 4,031,351 A * | 6/1977 | Martin | 219/121 |
| 4,158,171 A | 6/1979 | Abbe et al. | 324/158 |
| 4,161,285 A | 7/1979 | Matheny et al. | 239/132.3 |
| 4,503,313 A | 3/1985 | Tsutsumi | 219/121 |
| 4,659,900 A | 4/1987 | Gilli et al. | 219/121 |
| 4,675,501 A | 6/1987 | Klingel | 219/121 |
| 4,813,611 A * | 3/1989 | Fontana | |
| 5,083,006 A | 1/1992 | Stroud | 219/121.71 |
| 5,220,149 A | 6/1993 | Neidhardt | 219/121.67 |
| 5,247,155 A * | 9/1993 | Steen | 219/121.83 |
| 5,375,890 A | 12/1994 | Keevil et al. | 324/688 |
| 5,463,202 A | 10/1995 | Kurosawa et al. | 219/121.88 |
| 5,489,888 A | 2/1996 | Jagiella et al. | 340/537 |
| 5,756,961 A | 5/1998 | Sato et al. | 219/121.67 |
| 5,759,428 A | 6/1998 | Balamane et al. | 219/121.66 |
| 6,008,465 A | 12/1999 | Horn | 219/121.62 |

FOREIGN PATENT DOCUMENTS

| | | | |
|---|---|---|---|
| JP | 56-136295 | * | 10/1981 |
| JP | 8-242043 | * | 9/1996 |

OTHER PUBLICATIONS

"Adjust Box EG 316Z with Remote Control 301", precitec GmbH, Lasermatic Z, dated Jan. 3, 1996, three pages.

* cited by examiner

Primary Examiner—Geoffrey S. Evans
(74) Attorney, Agent, or Firm—Pandiscio & Pandiscio (57) ABSTRACT

An improved method and apparatus for laser cutting a thin fragile material using a high velocity assist gas to remove molten material and laser-generated debris is characterized by the high velocity assist gas exerting substantially zero force on the material being cut. An improved form of gas assist laser gas assist nozzle is shaped to achieve a supersonic gas flow velocity that is used advantageously to effect rapid removal of ejected gas and other materials.

26 Claims, 4 Drawing Sheets

GAS ASSISTED LASER CUTTING OF THIN AND FRAGILE MATERIALS

This invention was made under U.S. Government Subcontract No. ZAF-6-14271-13.

BACKGROUND

Laser machining or cutting of materials relies on rapid local heating of the material. This usually results in a transition from the solid to the liquid phase and, at very high incident peak laser power, may even result in volatilization of the material. In order to obtain optimum laser cutting speed with minimal adhesion of slag or laser beam-generated debris in the vicinity of the kerf (i.e., the cut formed by the laser), an assist gas is used to transport the molten material away from the kerf. A laser cutting process can normally be accelerated by directing a stream of high velocity assist gas, e.g., air, at the laser beam impingement area of the material. In the case of cutting a material in sheet or plate form, the molten material is blown through the cut by the assist gas. This blowing action reduces the availability of the material inside the kerf for resolidification or laser energy absorption, thus accelerating the cutting process. The usual practice is to produce the assist gas stream by means of a gas nozzle having an orifice that is larger than the focused laser beam, located near the focal point of the beam, coaxial to the beam, and disposed so that the direction of the gas stream is normal to the surface of the material being cut. Various forms of gas assist laser nozzles are known. See, for example, the nozzles disclosed in U.S. Pat. No. 4,728,771 issued Mar. 1, 1988 to F. Sartorio and U.S. Pat. No. 5,463,202 issued Oct. 31, 1995 to M. Kurosawa et al.

Figure 1:
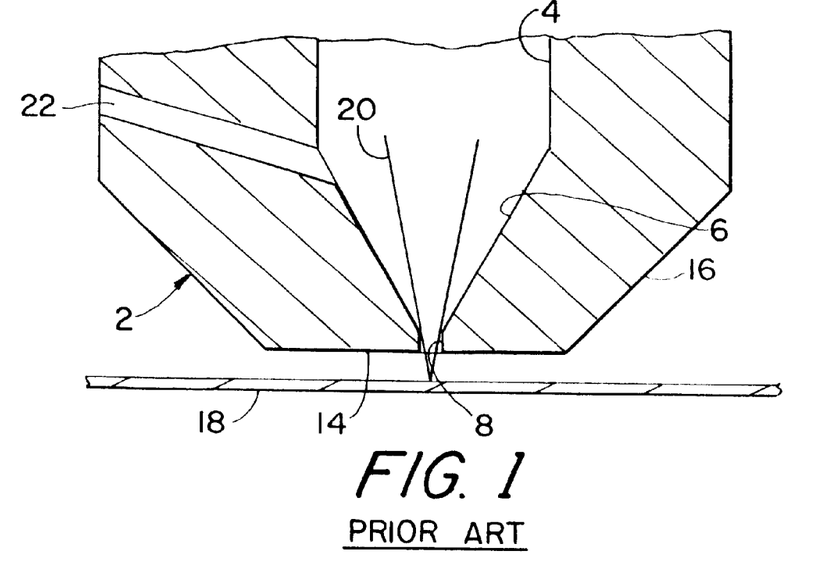
FIG. 1 is a cross-sectional view of the tip of a conventional gas assist nozzle.

FIG. 1 illustrates the configuration of the tip portion 2 of a gas assist nozzle representative of prior art designs. The nozzle has an internal passageway 4 that terminates in an outlet orifice comprising a conical upstream section 6 and a constant diameter throat section 8. The end face of the nozzle tip has a flat relatively wide annular end surface 14. The outer surface 16 is conically tapered. The nozzle tip portion 2 is shown with its end face confronting a sheet-like workpiece 18. A focused laser beam represented generally at 20 is directed normal to the workpiece. It should be noted, by way of example but not limitation, that the workpiece 18 may be one of the sides or facets of an EFG-grown silicon tube that has an octagonal cross-sectional configuration. Although not shown, it is to be understood that the opposite end of passageway 4 terminates in an inlet orifice that is coaxial with outlet orifice sections 6 and 8. An assist gas flow is introduced under pressure into the nozzle via one or more gas inlet ports 22 and is discharged through the discharge orifice 6, 8 to the region of the workpiece that is undergoing laser cutting. Some of the gas discharged from the nozzle passes through the cut formed in the workpiece by the laser beam, while the remainder of the gas is deflected laterally away from the impact area, flowing outwardly from between the nozzle and the workpiece. The reason that the outer surface 16 extends at an acute angle to the end face section 14 is to facilitate dispersion of the assist gas radially and back away from the workpiece. The velocity of the gas stream directed at the material is determined by the gas pressure on the upstream side of the nozzle orifice and the shape of the nozzle discharge orifice. Regardless of the nozzle orifice design or the gas pressure, a localized force is exerted by the assist gas as it impinges on the material being cut by the laser. The force is increased by increasing the flow (increase in effective orifice size) and/or the gas flow velocity. Depending on the amount of flow and the velocity of the assist gas impinging on the sheet material being cut, the localized force exerted by the assist gas on the material being cut can be substantial. In the case of a thin and fragile material, this force can lead to undesired material fracture. This troublesome situation exists in the case of laser cutting thin EFG-grown silicon tubes to produce wafers for use in making photovoltaic solar cells.

The EFG method of growing crystalline materials from a melt is used to grow doped silicon tubes of selected cross-sectional shapes, e.g., tubes having an octagonal or cylindrical cross-sectional shape. Those tubes are cut by a laser into rectangular wafers, and those wafers are then subjected to various processing steps to convert them into photovoltaic cells. The growth of silicon tubes by the EFG method and the method of processing of silicon wafers to produce photovoltaic cells are well known, as illustrated by the disclosures of U.S. Pat. No. 4,937,053, issued Jun. 26, 1990 to D. S. Harvey, U.S. Pat. No. 4,751,191, issued Jun. 14, 1988 to R. C. Gonsiorawski et al., U.S. Pat. No. 5,698,451, issued Dec. 16, 1997 to J. I. Hanoka, U.S. Pat. No. 5,106,763, issued Apr. 21, 1992 to B. R. Bathey et al. U.S. Pat. No. 5,037,622, issued Aug. 6, 1991 to D. S. Harvey et al., U.S. Pat. No. 5,270,248, issued Dec. 14, 1993 to M. D. Rosenblum et al., and U.S. Pat. No. Re. 34,375, issued Sep. 14, 1993 to B. H. Mackintosh.

It is desirable for a variety of reasons for the EFG-grown silicon tubes to have a wall thickness of 15 mils (0.015 inch) or less, preferably about 6–7 mils. Although other lasers may be used, a Nd:YAG laser has been preferred for cutting EFG-grown silicon tubes into rectangular wafers. The laser beam forms a small circular image or a narrow elongated image at its focal plane. To optimize the cutting speed, it is necessary to focus the laser beam on the surface of the silicon tube being cut. Unfortunately the surfaces of such tubes are not exactly flat, but tend to be uneven as a consequence of undulations and/or random peaks and depressions, with a flatness deviation commonly ranging from about 3 mils to about 7 mils. As a consequence, it is necessary to employ an autofocusing system for the laser so as to keep the laser beam focused on the silicon tube surface as the laser beam is moved relative to the tube.

In addition to having uneven surfaces, silicon tubes having a thickness of 15 mils or less are quite fragile. Although nozzles as shown in FIG. 1 confine gas flow to the immediate area of laser beam impingement (an essential requirement of any effort to limit the forces exerted on the silicon tubes by the assist gas), it is still necessary to have rapid and adequate assist gas flow in order to remove molten material from the kerf. However, achieving a rapid gas flow requires an adequate gas supply pressure, and while an increase in gas pressure will increase the quantity of gas that is discharged by the nozzle, it also increases the force exerted by the assist gas on the material being cut. As a consequence, the laser cutting of thin silicon tubes has been characterized by a frequent fracturing of the wafers being cut out of the tubes. For this reason, there has been a need to limit the localized force exerted on the silicon tubes by an assist gas during the laser cutting operation, while maintaining a high enough gas velocity to efficiently eject molten material from the kerf produced by the laser.

OBJECTS AND SUMMARY OF THE INVENTION

The primary object of this invention is to provide an improved method and apparatus for conducting gas assisted laser cutting of thin and fragile materials.

Another object is to provide a method of laser cutting a fragile material using a gas to remove molten material and laser-generated debris which is characterized by a high velocity gas glow that exerts substantially zero net force on the material being cut.

A further object is to provide a gas assist nozzle for laser cutting which is shaped so as to permit the assist gas to flow at a sonic or supersonic velocity, whereby removal of molten material from the cut region can be accomplished efficiently while the gas flow exerts substantially zero net force on the material being cut.

A further object is to provide a gas assist nozzle for a laser that is characterized by a tip that makes it possible to achieve a zero net force at sufficiently large gaps of 1.0 mm or greater between the nozzle and the material being cut (i.e., different stand-off distances).

The foregoing objects, and other objects rendered obvious by the following description, are achieved by a gas assist nozzle that discharges a high velocity assist gas and is positioned so that the flowing assist gas exerts substantially no net force on the material being cut. In a preferred form, the nozzle is characterized by a tip having a negative conical (concave) end surface and is designed to function as supersonic gas flow device. Other features and advantages of the invention are disclosed or rendered apparent by the following detailed description of the invention which is to be considered together with the accompanying drawings.

SPECIFIC DESCRIPTION OF THE INVENTION

The magnitude and distribution of the gas by the gas assist nozzle is affected by the gas velocity, the mass flow of the gas, and the nozzle orifice diameter. It is also affected by the nozzle standoff distance, i.e., the distance of the gap between the workpiece and the front end surface of the nozzle tip. As the standoff distance is decreased, the force become more concentrated, ultimately impinging on an area approximating the size of the nozzle orifice.

The force exerted by a gas stream discharged by a nozzle having a tip as shown in FIG. 1 varies with standoff distance. Using a gas assist nozzle having a tip shaped as shown in FIG. 1 with a throat section 8 diameter of 1.0 mm and a gas supply pressure of 30 psi, it has been discovered that if the standoff distance is set to a value equal to about 0.4 mm, the gas flowing in the gap between the nozzle tip and the workpiece creates a partial vacuum as it rapidly expands radially inside that gap. Due to this partial vacuum, a force is generated that draws the workpiece toward the nozzle tip and essentially cancels the force of the gas impinging on the workpiece directly in front of the nozzle orifice. This condition is called the "zero net force condition" or "balanced force condition". In this flow regime the gas flow rate as measured at the nozzle input and at a constant gas supply pressure remains constant and equal to the flow when the nozzle is unobstructed. The nozzle now essentially floats on top of the adjacent surface of the workpiece in the manner of an air bearing without contacting the nozzle tip. It has been discovered also that decreasing the standoff distance further, i.e., below 0.4 mm, while keeping the gas supply pressure constant produces a significantly increased vacuum generated force with the gas flow remaining constant. The vacuum generated force stresses the workpiece. However, decreasing the standoff distance even more to approximately one-tenth of the effective orifice diameter, i.e., to about 0.1 mm, again produces a balanced force condition but at a substantially reduced gas flow. Also, as the nozzle tip further approaches the surface of the workpiece, the force exerted on the substrate by the gas becomes rapidly positive.

Figure 3:
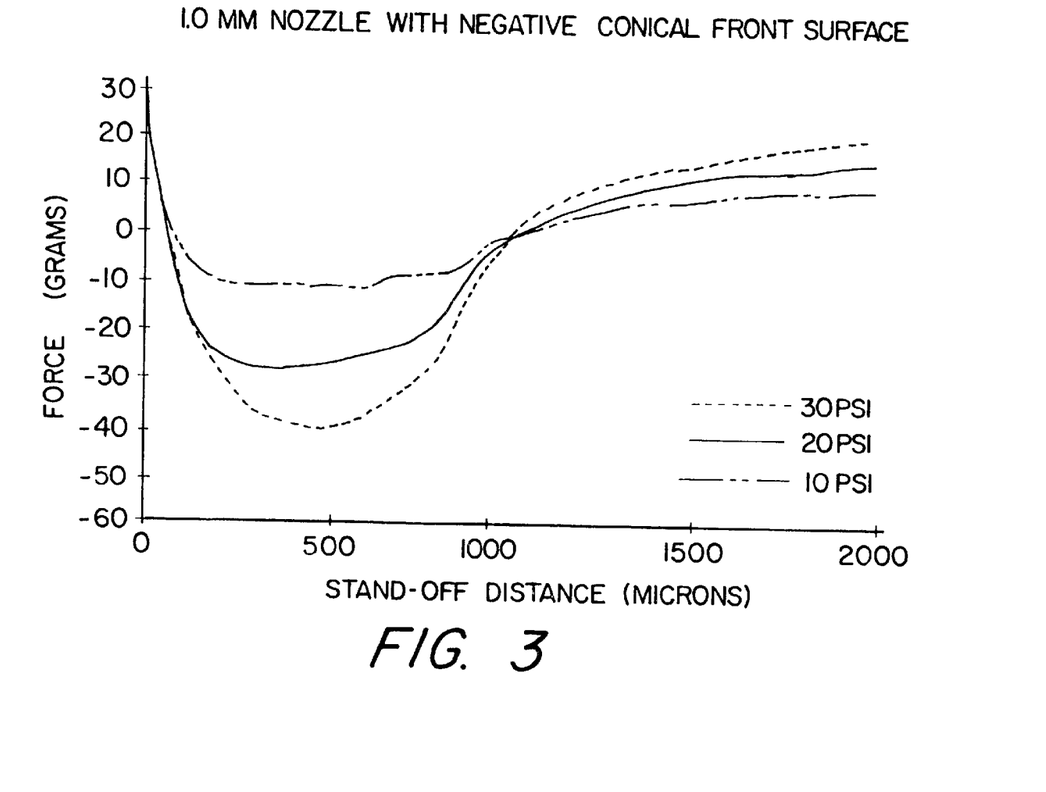
FIG. 3 is a plot showing the effect of stand-off distance on the force exerted on selected workpiece by a flowing assist gas using a nozzle having a tip configuration as shown in FIG. 2.

It has been determined that the most desirable operating point with respect to standoff distance is the point where the positive and negative forces on the workpiece are equal and in balance, i.e., the zero net force condition, and where the standoff distance is the largest. Accordingly, for a nozzle as shown in FIG. 1 having 1.0 mm effective discharge orifice, that condition is met by having a standoff distance of approximately 0.4 mm. However, as shown by FIG. 3, it has been determined that the rate of change in force with standoff distance is greater at standoff distances below rather than above the approximately 0.4 mm. balanced force position. Therefore, since a primary object is to avoid excessive stressing of a fragile material like a thin EFG silicon tube, and since the rate of change in force with standoff distance is greater at standoff distances below rather than above the approximately 0.4 mm. balanced force position, a slightly greater standoff distance (e.g., between about 0.5 and 0.6 mm) is preferred. A 1.0 mm decrease in standoff distance from 0.5 or 0.6 mm is less likely to excessively stress a fragile material like a thin EFG tube than is a decrease of the same magnitude from a distance of approximately 0.4 mm.

However, although acceptable cutting results can be achieved when laser cutting fragile silicon tubes using a nozzle as shown in FIG. 1 at a standoff distance in the range of 0.4 to 0.6 mm, in practice a greater standoff distance is preferred to avoid collision between the nozzle tip and the workpiece, particularly in the case of cutting EFG tubes since the surfaces of such tubes are not exactly flat.

Figure 2:
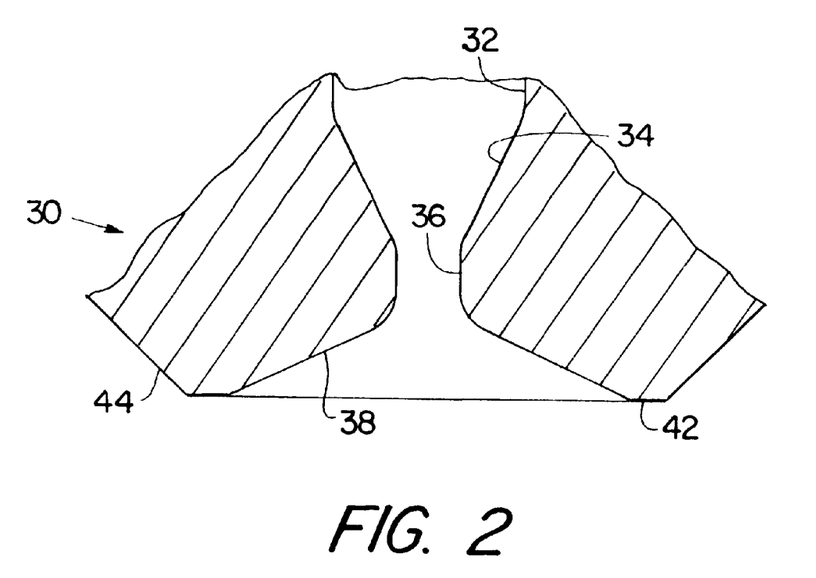
FIG. 2 is a cross-sectional view of the tip of a preferred form of nozzle embodying the present invention.

In this connection it appears that an outlet orifice shaped as shown in FIG. 1 functions substantially as if it has a constant diameter, i.e., functions as if it were a cylinder, with the result that the maximum gas velocity is more or less limited to the speed of sound. However, according to the present invention, the gas velocity at equivalent gas pressure can be increased by shaping the orifice so that its diameter is first constricted and then is expanded outwardly when viewed in cross-section parallel to the direction of gas flow. FIG. 2 illustrates the tip of a nozzle that is designed to discharge assist gas at supersonic velocities. More specifically, the nozzle shown in FIG. 2 is designed to discharge assist gas at a velocity of about Mach 2. In this case the end face of the nozzle tip is characterized by a negative conical (concave) configuration generally similar to the nozzle of a rocket engine, commonly called a "Laval nozzle". The shape of the discharge orifice permits the gas stream to expand in such a way as to achieve supersonic velocity while avoiding mechanical stress on the fragile EFG silicon material.

More specifically, the nozzle tip 30 shown in FIG. 2 has an internal passageway 32 that is terminated by a discharge orifice that comprises a generally conical section 34 behind a throat section 36 of reduced diameter. In front of throat section 36 the discharge orifice comprises a negative conical expansion section 38. The combination of throat section 36 and conical section 38 enables the nozzle to discharge assist gas at supersonic velocities using practical gas supply pressures. The forward end of the second forward expansion section 38 terminates in a flat surface 42 that extends at substantially a right angle to the nozzle axis and parallel to the adjacent surface of a workpiece (not shown) to be cut. The outer surface 44 of the nozzle tip extends at an acute angle to flat surface 42 so as to facilitate dispersion of the high velocity assist gas radially and also away from the workpiece. Although not shown, it should be noted that a nozzle having a tip as shown in FIG. 2 also has gas inlet ports like ports 22 of the design shown in FIG. 1, and the outer end of passageway 32 has an inlet orifice that is coaxial with the discharge orifice.

Further with respect to the "zero net force condition" or "balanced force condition", in relation to the nozzle of FIG. 2 (a) in the region of throat section 36 a positive force is exerted on the workpiece by the flowing gas, (b) this force decreases with increasing orifice distance from the center line (the region of conical section 38) until a radius is reached (the region of flat end surface 42) at which a vacuum condition exists that produces a negative force on the workpiece, and (c) as the radial distance from the center line increases beyond the perimeter of end surface 42 (the region of outer surface 44) the force exerted by the flowing gas is again reversed, producing a small positive force at the periphery of the nozzle tip. A substantially zero net force condition with respect to the workpiece is considered to exist when the integrated positive forces exerted by the flowing assist gas in the region extending from the nozzle's center line to the junction of the surfaces 38 and 42 substantially equals the integrated negative forces exerted by the same gas in the region extending from the inner edge to the outer edge of nozzle end surface 42.

Providing a nozzle that permits gas discharge at sonic or supersonic speeds is advantageous since generally the higher the gas velocity, the cleaner the laser cut and the more efficient the material removal. Material transformation directly from a solid to the gas phase can be achieved in the laser cutting process when very high peak power is used. Gas ejected from the workpiece material at the beam impact site typically has a velocity of approximately Mach 2. The present invention recognizes that an assist gas velocity of about Mach 2 or higher could be used advantageously to affect the direction and ultimate location of ejected gas or material. A nozzle having a novel tip configuration according to the invention (i.e., a tip as shown in FIG. 2) can be operated so as to produce a Mach 2 gas assist discharge velocity at increased gas input pressure while preserving a zero net force condition.

For laser cutting of EFG silicon tubes using a narrow diameter laser beam, it is desirable and preferred to use a gas assist nozzle having a minimum discharge orifice diameter (the throat diameter) of 1.0 mm. By empirical and iterative design a nozzle having a tip geometry as shown in FIG. 2 and a throat diameter of 1.0 mm was created that (a) permits assist gas discharge at supersonic speeds using a practical gas supply pressure and (b) provides a zero net force condition at a standoff distance greater than what is achievable with a conventional nozzle of the type shown in FIG. 1 having the same throat diameter.

Referring again to FIG. 2, a preferred form of supersonic gas assist nozzle is characterized by the following characteristics: cylindrical throat section 36 has a diameter of 1.0 mm and a length of about 1.0 mm; conical sections 34 and 38 have tapers of about 25 degrees and about 63.6 degrees measured from the center axis of throat section 36, flat end surface 42 extends at an angle of 90° to the center axis of throat section 36, and outer surface 44 extends at an angle of 45 degrees to flat surface 42, the circularly extending juncture of surfaces 38 and 42 has a diameter of about 4.25 mm, and the juncture of surfaces 42 and 44 has a diameter of 7.5 mm. With such a nozzle, it has been determined that a gas flow velocity of Mach 2 can be achieved using a gas supply pressure of 80 psi. A further advantage is that with like throat diameters and using the same gas supply pressure, a nozzle tip as shown in FIG. 2 will provide a substantially greater throughput of assist gas than a nozzle having a tip as shown in FIG. 1.

FIG. 3 demonstrates that a nozzle having a tip configuration as shown in FIG. 2 and constructed with the dimensions provided in the foregoing paragraph, achieves a zero net force condition at a standoff distance of approximately 100 microns (0.01 mm) and also at a standoff distance of 1000 microns (1 mm). Moreover, FIG. 3 shows that those net force conditions are achieved at three different gas supply pressures, 10, 20 and 30 psi. The same zero net force condition at a standoff distance of approximately 1 mm exists if the gas supply pressure is increased to 80 psi to achieve a gas discharge flow velocity of Mach 2.

Figure 4:
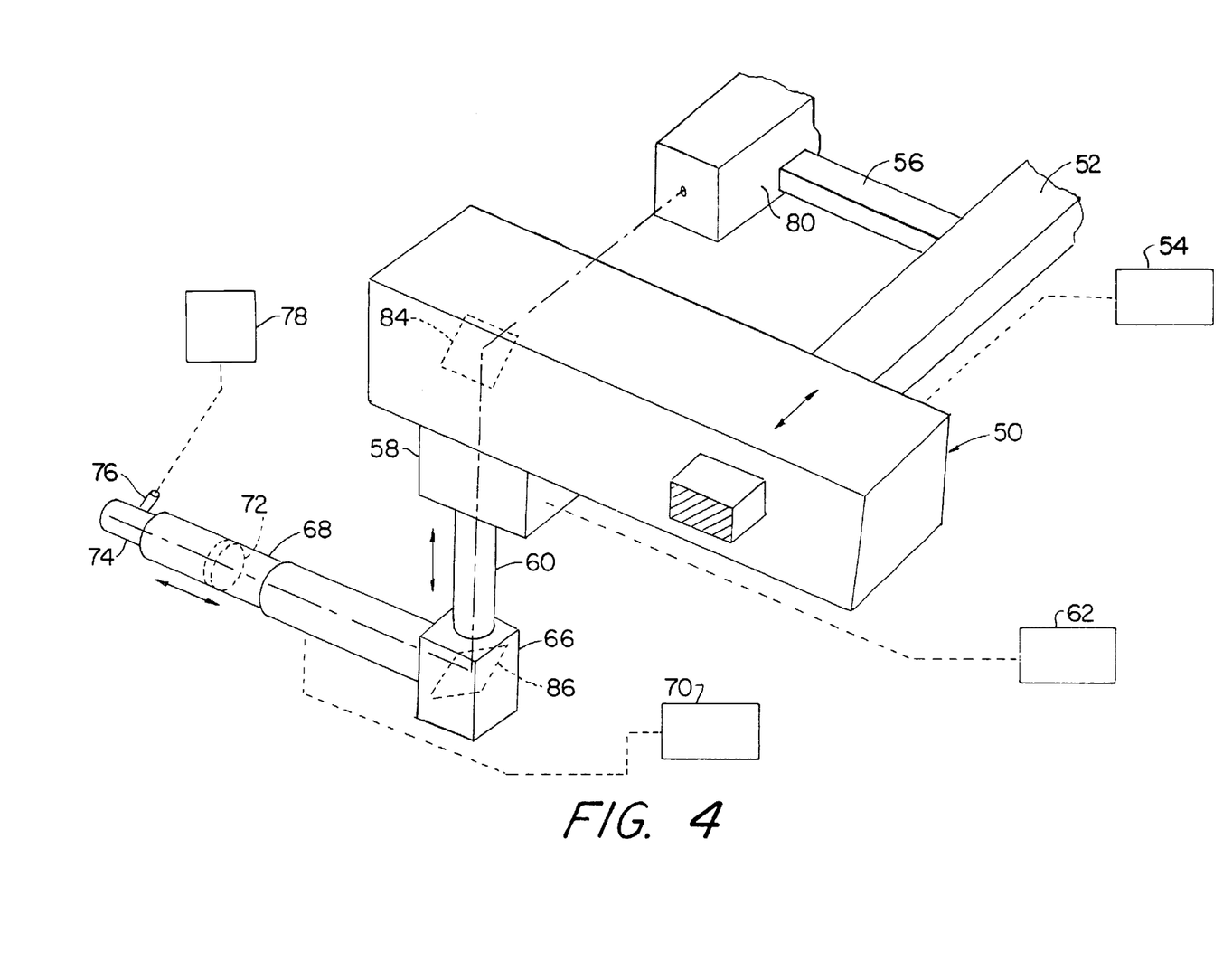
FIG. 4 is a schematic representation (with certain parts broken away or shown in section) of a laser cutting apparatus for use in cutting wafers from a silicon tube according to the present invention.

FIG. 4 schematically illustrates a laser apparatus for cutting wafers out of EFG-grown silicon tubes. The apparatus comprises a carriage 50 that is mounted for reciprocal movement on a horizontal rail 52 that is affixed to a stationary support (not shown). Rail 52 determines the X-axis movement of a laser gas assist nozzle 74. Only a portion of rail 52 is shown, but it should be understood that it is long enough to permit an X-axis excursion sufficient for achieving the desired length of laser cut along the X-axis. A reversible motorized drive system 54 mechanically coupled to carriage 50 serves to move the carriage along rail 52 in either direction. Attached to and movable with carriage 50 is a telescoping unit 58 having a vertically-extending tubular member 60 that is capable of reciprocal axial movement and determines the Y-axis movement of the laser nozzle. A reversible motorized drive system 62 is mechanically coupled to telescoping unit 58 and serves to move the tubular member 60 axially in either direction along the Y-axis. Attached to the vertical member 60 of telescoping unit 58 is a second telescoping unit 66 having a horizontally extending tubular member 68 that is capable of reciprocal axial movement and determines the Z-axis movement of the laser nozzle. A reversible motorized drive system 70 is mechanically coupled to telescoping unit 66 and serves to move the tubular member 68 axially in either direction.

Tubular member 68 contains a laser-focusing optical lens unit represented schematically at 72 and serves as a support for a gas assist nozzle 74 that preferably embodies the nozzle tip design shown in FIG. 3 but may embody some other tip design, e.g., a tip design as shown in FIG. 1. Nozzle 74 has a gas inlet port 76 that is coupled to a source 78 of a pressurized assist gas, e.g., air, oxygen, or nitrogen. It is recognized that a gas flow barrier is needed to prevent the assist gas from flowing backward toward the source of the laser beam. Preferably this is achieved by using lens unit 72 as the gas flow barrier, in which case it is secured to the surrounding tubular member 68 by means of a gas impermeable seal which prevents the assist gas from flowing around the lens unit back toward the laser 80 instead of forward out of the nozzle orifice.

The laser apparatus also includes a laser 80. The latter is fixed with respect to rail 52, e.g. by a suitable support member 56 affixed to rail 52 (or to the stationary support for that rail). The laser 80 may take various forms, but preferably it is a Nd:YAG laser that is operated at a pulse repetition rate of 225 Hz and with an output power of 150 watts. Optical beam-directing means are employed to direct the beam so that it will pass through the discharge orifice of nozzle 74. Such optical beam-directing means may take the form of fiber optics, but preferably mirrors as represented schematically at 84 and 86 are used to direct the laser beam to the focusing lens unit 72. The laser is positioned so as to direct its beam to mirror 84. The mirrors are oriented at 45° angles so that mirror 84 causes the beam from laser 80 to be turned 90° from a horizontal direction parallel to rail 52 to a downward vertical direction and mirror 86 causes the beam to be turned 90° from that vertical direction to a horizontal direction that is displaced 90° from rail 52. The laser beam is directed by mirror 86 through the inlet orifice of nozzle 74 along the nozzle's axis, so that the beam will pass out of the discharge orifice of the nozzle at a workpiece located in front of the nozzle, with the beam being focused on the workpiece by focusing lens unit 72. It should be noted that telescoping units 58 and 66 and their tubular members 60 and 68 serve a safety function in that they physically shield the laser beam.

Essentially the foregoing combination of carriage 50, rail 52, and telescoping units 58 and 56 function as a triple-axis-motion support for the gas assist nozzle and the laser beam-directing optics. The representation of apparatus in FIG. 4 is not intended to be limiting since the form of triple-axis motion support (commonly called an X-,Y-,Z-axis table) and the means for folding and focusing the laser beam are not critical and form no part of the invention, and invention may be practiced using various forms of triple-axis-motion support.

The focusing optics represented schematically at 72 is fixed, i.e., it has a fixed focal plane located a predetermined distance beyond the nozzle tip, e.g., 1 mm. Alternatively the focusing optical unit 72 may be replaced by an adjustable (variable) focal lens system incorporated into the tubular member 68. The adjustable focal lens system may be of a type that is adjusted manually, e.g. by a screw-type adjusting mechanism, or by a remotely controlled motor-driven mechanism. Adjusting the focal lens system to a predetermined focal length calculated to focus the beam at the desired distance beyond the nozzle tip is conducted at the outset of the cutting operation. For cutting wafers from EFG-grown silicon tubes, it is preferred for the purpose of lowering cost to use a fixed focus optical focusing lens unit 72.

Figure 5:
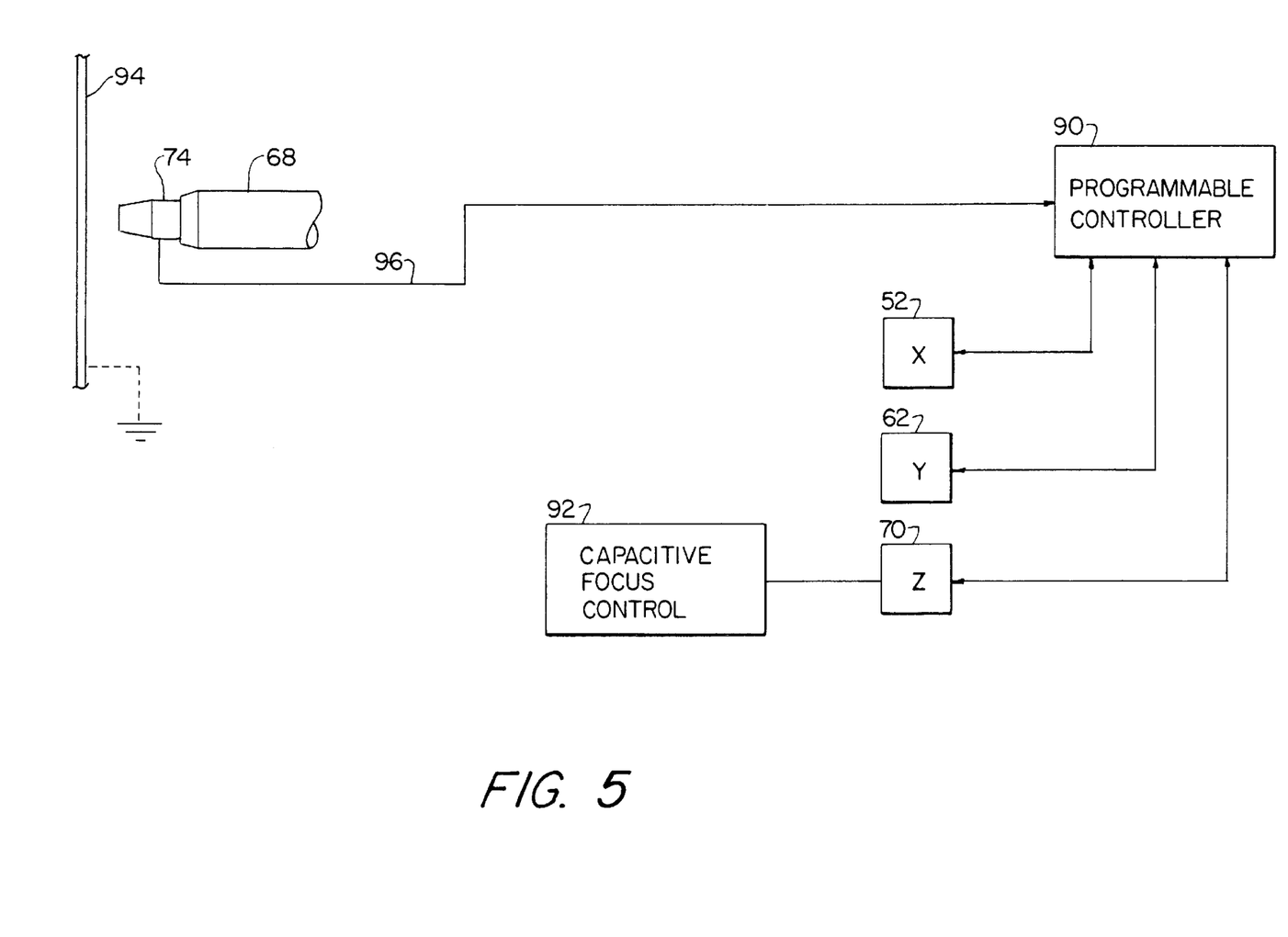
FIG. 5 is a schematic illustration of the system for operating and controlling the apparatus of FIG. 4.

Referring to FIGS. 4 and 5, the X-, Y- and Z-axis drive systems 54, 62 and 70 respectively comprise electronically controlled motors that are coupled to a programmable controller 90. The control system also comprises a capacitive autofocusing system which includes a capacitive/interface focus control module 92, nozzle 74 and a workpiece 94. Nozzle 74 is connected to controller by an electrically insulated line 96 and acts as an electrode of the capacitive autofocusing system. The workpiece, e.g., a silicon tube, serves as the ground electrode of the autofocusing system. The apparatus is adapted to sense changes in capacitance between the nozzle and workpiece and to produce an output signal in response to those changes in capacitance that is used by programmable controller 90 and capacitive focus control 92 to cause Z-axis drive system 70 to move nozzle 74 in a direction to keep constant the standoff distance between the nozzle and the workpiece.

The capacitive/interface focus control module is well known in the art of capacitive autofocus systems. Preferably the apparatus employs the focus control module sold by Haas Laser Technologies, Inc. of Landing, N.J. under the designation "Option #1, AFS-5100". An acceptable alternative focus control system, identified as "Adjust Box EG 316Z" is available from Precitec GmbH of Gaggenau-Bad Rotenfels, Germany. The programmable controller 90 may be a digital computer containing a suitable program for operating the triple axis drive systems 54, 62 and 70 so as to cause the laser gas assist nozzle to move in a predetermined pattern relative to the workpiece. Preferably controller 90 comprises a digital computer containing the program identified as "PMAC" developed by Delta-Tau of Chatsworth, Calif. Another suitable motion controller is available from Allen-Bradley Company. By way of example, but not limitation, the motors of drive systems 54, 62 and 70 may be driven by servoamplifiers using feedback generated using Hall Effect sensors built into the motion system. Still other means known to persons skilled in the art may be used to control operation of the motors of drive systems 54, 62 and 70. In the case of cutting wafers from EFG-grown tubes, the controller 90 is programmed so as to cause the laser to cut out rectangular-shaped wafers while maintaining the gas assist nozzle at a fixed distance from the tube, and to operate the Z-axis drive to move the laser gas assist nozzle away from the workpiece after a cutting operation has been completed so as to facilitate removal of the piece that has been cut out of the workpiece.

In the case of cutting wafers from EFG silicon tubes, the cutting process involves the following steps: (1) positioning the laser gas assist nozzle so that it is at a selected standoff distance at which the laser beam will be focused on the adjacent face or surface of the silicon tube and substantially zero force will be exerted on the tube by the assist gas, (2) activating laser 80 and the X- and Y-axis drives so as to cause the laser beam to cut a rectangular wafer from the silicon tube, (3) deactivating laser 80, (4) moving the laser gas assist nozzle away from the silicon tube so as to facilitate removal of the cut piece by a wafer-holding means (not shown), and (5) repeating the foregoing steps for successive cutting operations. Cutting rectangular wafers involves moving the laser gas assist nozzle so that the laser beam traverses two horizontal and two vertical strokes, with the strokes occurring in any selected order. Preferably, but not necessarily, the cutting operation involves in succession a vertical stroke to form a cut defining one side of a wafer, a horizontal stroke to form a cut defining a second side of the wafer, and a second vertical stroke and a second horizontal stroke to form cuts defining third and fourth sides of the wafer. One or more wafers may be cut out of each side of a polygonal EFG tube, depending on the width of the sides of that EFG tube and the desired dimensions of the wafer to be cut, Additional successive wafer cutting operations involve rotating the EFG silicon tube on command (by suitable means not shown) so as to permit wafers to be cut out of different sides of the tube. The rotation of the silicon tube is accomplished during the period when the laser gas assist nozzle is retracted away from the workpiece. The capacitive autofocusing means senses changes in the standoff distance, including those caused by deviations in flatness of the tube's surface in the region of impingement by the laser beam, and immediately responds to those sensed changes by causing the Z-axis drive to operate in a direction that will keep the standoff distance constant, thereby assuring that substantially no load is imposed on the fragile silicon tube by the high velocity assist gas. Keeping the standoff distance constant keeps the laser beam focused on the adjacent surface of the silicon tube.

Prior to the present invention, it was recognized that a $CO_2$ laser could provide more power and hence cut EFG-grown silicon tubes at a faster rate than a Nd:YAG laser. The increased cutting rate tends to necessitate higher gas flow rates in order to effect removal of molten material from the kerf cut by the laser beam. However, increasing the rate of gas flow involves increasing the pressure at which the assist gas is supplied to the cutting zone via the nozzle. Prior to the present invention, the greater assist gas supply pressure required to achieve the higher flow rates desired to assure efficient removal of molten material and debris resulted in an increased localized force being exerted on the EFG-grown silicon tubes, thereby increasing the probability of breakage of those expensive tubes. The zero net force nozzle of this invention permits use of a higher assist gas supply pressure to achieve increased flow rates in the cutting zone while minimizing stressing of the EFG tubes. As a consequence the invention makes it feasible to use a higher power $CO_2$ laser in place of the lower power Nd:YAG laser to cut EFG silicon tubes, thereby improving cutting rates substantially.

By way of example but not limitation, tests have shown that using a zero net force nozzle as provided by the present invention and an assist gas (air) supplied at approximately 60 psi, 300 microns thick EFG-grown silicon material can be cut, without any breakage caused by excessive assist gas pressure, at speeds up to 40 cm/sec using 500 watts of $CO_2$ laser power (at 2.5 kHz and 216 $\mu$sec. pulse width). That greatly exceeds the cutting speed of 2.5 cm/sec typically achieved with the same silicon material using a Nd:YAG laser operating at 225 W and the same nozzle and assist gas with the latter being supplied at a pressure of about 30 psi. It has been determined that use of a $CO_2$ laser is not limited to EFG tubes with a thickness of 300 microns. Thus, further by way of example but not limitation, the same kind of laser may be used as herein disclosed to cut EFG-grown silicon tubes having a thickness in the range of 100 $\mu$m to 1 cm at a substantially faster rate than is possible with a Nd:YAG laser. The higher assist gas flow rates used with a $CO_2$ laser also help to minimize the appearance of dross on the laser beam exit side of the cut wafer.

The invention has a number of advantages. For one thing, the invention reduces the gas-imposed stress on workpieces of fragile materials, thereby avoiding damage to those workpieces. Additionally the invention allows use of gas velocities greater than the speed of sound, thereby assuring effective removal of residue from the cut workpiece. Although use of a nozzle having a tip shaped like or similar to the tip represented in FIG. 2 is preferred due to the greater gas velocities that are obtained, a nozzle as represented in FIG. 1 also may be used where the objective is to maintain a constant standoff distance with the standoff distance being selected so that the assist gas exerts little or no force on the workpiece, thereby avoiding fracture of the workpiece due to excessive stressing. Notwithstanding the fact that it has been described herein in the context of cutting rectangular wafers from EFG silicon tubes, the invention may be used to perform similar or different cutting operations on silicon or on other fragile or non-fragile materials. Thus controller 90 also may be programmed so as to cause the laser to cut workpieces according to a variety of cutting patterns other than rectangular, e.g., circular, hexagonal, etc. Another advantage is that the invention is not limited to cutting wafers or other products out of workpieces and the laser may be used, for example, to form a pattern of holes and/or slits in a workpiece for decorative or other purposes. A further advantage is that the invention is not limited to use with Nd:YAG and $CO_2$ lasers. Thus, for example, the invention also may be used to facilitate cutting materials with a copper vapor laser. Still other advantages will be obvious to persons skilled in the art.

The invention may be practiced other than as illustrated or described above. In this connection, it should be noted that in providing a nozzle having a tip as shown in FIG. 2, the shape and size of the discharge orifice, notably the dimensions and angular dispositions of the surfaces 32, 34, 36, 38, 42 and 44 and their junctions with each other may be modified without departing from the principles of the invention. Changing the shape and size of the discharge orifice may be done to increase the overall rate of flow and/or to change the stand-off distance(s) at which a zero net force condition can be achieved. As noted above, the periphery of focusing lens unit 72 is attached to the tubular member 68 by means of an hermetic seal, so as to permit the lens unit to act as a barrier to backflow of assist gas. As an alternative, it is contemplated that the nozzle could be provided with a window transparent to the laser beam that is mounted in the nozzle in front of the focusing lens unit, with the window being hermetically sealed to tubular member 68 and thus acting as a barrier to assist gas backflow toward the laser. This alternative eliminates the need for hermetically sealing the lens unit 72, thereby permitting it to be mounted in a way that facilitates its removal and replacement.

It is also contemplated that the apparatus schematically shown in FIGS. 4 and 5 for supporting and moving the gas assist nozzle may take various forms and, for example, may be replaced by apparatus as shown by U.S. Pat. No. 4,659,900, issued Apr. 21, 1987, U.S. Pat. No. 4,728,771 issued Mar. 1, 1988 and U.S. Pat. No. 5,756,961 issued May 26, 1998. It is to be also noted that instead of mounting the laser gas assist nozzle on a triple-axis-motion support table, it is possible to mount the workpiece on a dual-axis (X- and Y-axis) motion table and to mount the laser gas assist nozzle on a single axis (Z-axis) motion support, with the dual axis motion table being operated to move the workpiece relative to the laser nozzle, and the single axis motion support being used to establish a desired standoff distance calculated to produce a substantially zero net force condition as described above. Still other arrangements for providing relative movement between the nozzle and the workpiece will be obvious to persons skilled in the art from the foregoing description and also from U.S. Pat. No. 4,503,313, issued Mar. 5, 1985. Another possible modification is to replace the capacitive autofocusing means with some other type of autofocusing means known to persons skilled in the art, e.g., an optical autofocusing system. Still other changes and modifications will be obvious to persons skilled in the art from the foregoing description.

What is claimed is:

1. A laser cutting apparatus for use in cutting pieces from a workpiece comprising:

a laser for generating a laser beam;

a nozzle assembly comprising a nozzle having inlet and outlet orifices and a gas inlet port for admitting an assist gas to the interior of said nozzle for discharge through said outlet orifice, and optical means disposed between said inlet and outlet orifices for (a) directing a laser beam admitted through said inlet orifice to and through said outlet orifice and (b) focusing said beam on a workpiece to be cut by said laser beam, means providing an optical path for said laser beam from said laser to said optical means via said inlet orifice;

means for supplying a gas to said gas inlet port under a selected pressure whereby to cause a high velocity stream of said gas to be discharged from said outlet orifice;

a nozzle positioning means comprising first and second means for moving said nozzle in X- and Y-axis directions in a plane essentially parallel to the plane of a workpiece to be cut, and a third means for moving said nozzle in a Z-axis direction orthogonal to said X- and Y-axis directions; and control means for operating said third means that said nozzle is in a selected cutting position relative to a workpiece at which the net force exerted on said workpiece by said high velocity gas stream is substantially zero.

2. A laser cutting apparatus according to claim 1 wherein said beam is focused on said workpiece when said nozzle is in said selected cutting position.

3. A laser cutting apparatus according to claim 1 wherein said nozzle has a tip characterized by a negative concave surface surrounding said outlet orifice.

4. A laser cutting apparatus according to claim 1 wherein said control means is programmed to maintain said nozzle so that its said tip is spaced from said workpiece by a selected distance of substantially 1.0 mm.

5. A laser cutting apparatus according to claim 1 wherein said control means includes an autofocusing means for maintaining said outlet orifice a selected distance from said workpiece.

6. A laser cutting apparatus according to claim 1 wherein said nozzle has a tip, and further wherein said control means includes an autofocusing means for sensing changes in distance between said tip and said workpiece and moving said nozzle assembly in accordance with said changes so as to maintain constant the distance between said tip and said workpiece.

7. A laser cutting apparatus according to claim 1 wherein said laser is a Nd:YAG or a $CO_2$ laser.

8. A method of laser cutting a fragile material workpiece using a laser cutting apparatus that comprises a laser for generating a laser beam, a movable laser gas assist nozzle assembly comprising a nozzle having inlet and outlet orifices and a gas inlet port for admitting an assist gas to the interior of said nozzle for discharge through said outlet orifice, optical means disposed between said inlet and outlet orifices for (a) directing a laser beam admitted through said inlet orifice to and through said outlet orifice and (b) focusing said beam on a workpiece to be cut by said laser beam, means providing an optical path for said laser beam from said laser to said optical means via said inlet orifice, means for supplying a gas to said gas inlet port under a selected pressure whereby to cause a high velocity stream of said gas to be discharged from said outlet orifice, and a nozzle positioning means comprising first and second means for moving said nozzle in X- and Y-axis directions in a plane essentially parallel to the plane of a workpiece to be cut and a third means for moving said nozzle in a Z-axis direction orthogonal to said X- and Y-axis directions, said method comprising the steps of;

(1) while supplying gas to said inlet port under a selected gas pressure, positioning said nozzle so that said beam is directed normal to said workpiece and so that said nozzle is disposed in a selected position spaced from said workpiece at which a substantially zero net force is exerted on said workpiece by said gas as it is discharged from said outlet orifice; and (2) activating said laser so as to produce a laser beam that is directed at and focused on said workpiece, and simultaneously selectively operating said nozzle positioning means so as to cause said nozzle and laser beam to move laterally parallel to said workpiece so as to cut said workpiece in a selected pattern.

9. Method according to claim 8 wherein said in step (2) said nozzle is moved in a rectangular pattern so as to cut a rectangular product out from said workpiece.

10. Method according to claim 9 wherein said workpiece is a tube of silicon and said nozzle positioning means is operated so as to cause said laser beam to cut rectangular wafers out of said tube.

11. Method according to claim 10 wherein said tube has a polygon cross-sectional configuration.

12. Method according to claim 9 wherein said nozzle is moved in turn through an upward vertical stroke, a sidewise stroke in a first direction, a downward stroke, and a sidewise stroke in a second direction opposite to said first direction, and further wherein operation of said laser is terminated at the end of each stroke and initiated at the beginning of the next stroke.

13. Method according to claim 8 wherein said nozzle is maintained at a distance of 1.0 mm. from said workpiece, said discharge orifice has a diameter of 1.0 mm, and said gas is supplied at a pressure between 10 and 30 psi or higher.

14. Method according to claim 8 wherein said gas is supplied at a pressure in the range of 10 to 80 psi.

15. Method according to claim wherein said nozzle has a tip characterized by a negative concave surface surrounding said outlet orifice.

16. Method according to claim 8 wherein said nozzle positioning means comprises sensing means for sensing changes in the distance between said workpiece and said nozzle resulting from changes in flatness of said workpiece, and means responsive to said sensing means for causing said third means to move said nozzle in a direction to maintain constant the distance from said nozzle to said workpiece.

17. A method according to claim 8 wherein said laser is a ND:YAG or a $CO_2$ laser.

18. A method of laser cutting a fragile material workpiece comprising the steps of:

providing a laser cutting apparatus that comprises a laser for generating a laser beam, a movable laser gas assist nozzle assembly comprising a nozzle having an inlet and an outlet orifice for a laser beam, means for introducing an assist gas into said nozzle for discharge via said outlet orifice, and optical means for (a) directing said laser beam so that it passes into said nozzle through said inlet and passes out of said nozzle via said outlet orifice and (b) focusing said beam on a workpiece to be cut by said laser beam;

positioning said nozzle so that said outlet orifice is at a selected standoff distance from a surface of a workpiece to be cut, said selected standoff distance being that at which substantially no net force is exerted on the workpiece by assist gas discharged from said outlet orifice at a high velocity;

supplying an assist gas under pressure to said nozzle for discharge via said outlet orifice, and simultaneously operating said laser so as to cause a laser beam to pass through said nozzle and impinge on said workpiece; and moving said nozzle parallel to said workpiece surface while (a) keeping constant said standoff distance and (b) maintaining the flow of assist gas and the transmission of said laser beam through said nozzle outlet orifice so as to cause said beam to cut said workpiece according to a predetermined pattern and to allow material removed from said workpiece by said laser beam to be swept away by assist gas flowing out of said outlet orifice.

19. A method according to claim 18 wherein said laser is a Nd:YAG or a CO$_2$ laser.

20. A method of cutting a wafer out of a thin silicon tube using a laser cutting apparatus that comprises a laser for generating a laser beam, a movable laser gas assist nozzle assembly comprising a nozzle having inlet and outlet orifices and a gas inlet port for admitting an assist gas to the interior of said nozzle for discharge through said outlet orifice, optical means disposed between said inlet and outlet orifices for (a) directing a laser beam admitted through said inlet orifice to and through said outlet orifice and (b) focusing said beam on a silicon tube to be cut by said laser beam, means providing an optical path for said laser beam from said laser to said optical means via said inlet orifice, means for supplying a gas to said gas inlet port under a selected pressure whereby to cause a high velocity stream of said gas to be discharged from said outlet orifice, and a nozzle positioning means comprising first and second means for moving said nozzle in X- and Y-axis directions in a plane essentially parallel to a tube to be cut and a third means for moving said nozzle in a Z-axis direction orthogonal to said X- and Y-axis directions, said method comprising the steps of:

(1) while supplying gas to said inlet port under a selected gas pressure, positioning said nozzle so that said beam is directed normal to a selected surface of said silicon tube and so that said nozzle is disposed in a selected position spaced from said selected tube surface at which a substantially zero net force is exerted on said silicon tube by said gas as it is discharged from said outlet orifice; and (2) activating said laser so as to produce a laser beam that is directed at and focused on said selected tube surface, and simultaneously selectively operating said nozzle positioning means so as to cause said nozzle and said laser beam to move laterally parallel to said selected tube surface so as to cut a wafer of selected shape out of said silicon tube.

21. A method according to claim 20 wherein said laser is a Nd:YAG or a CO$_2$ laser.

22. Method according to claim 20 wherein said assist gas is supplied to said nozzle at a pressure which results in said gas being discharged from said nozzle at a supersonic velocity.

23. Method according to claim 20 wherein step (2) is repeated by activating said laser and moving said nozzle and said laser beam laterally parallel to said selected tube surface so as to cut additional wafers out of said silicon tube.

24. Method according to claim 23 wherein said nozzle positioning means comprises sensing means for sensing changes in the distance between said selected tube surface and said nozzle resulting from changes in flatness of said selected tube surface, and means responsive to said sensing means for causing said third means to move said nozzle in a direction to maintain constant the distance from said nozzle to said selected tube surface.

25. A laser nozzle comprising:

a tip at one end thereof having a flat circular end surface with a central opening therein;

a passageway in said nozzle through which a laser beam can pass, said passageway terminating at said one end in an outlet orifice that includes said central opening, said outlet orifice having a first section comprising a first conical surface that extends from and is coaxial with said central opening and decreases in diameter with increasing distance from said end surface, a second section that communicates with said first section and comprises a substantially constant diameter surface that extends from and is coaxial with said first conical surface, and a third section that communicates with said second section, said third section comprising a second conical surface that extends from and is coaxial with said substantially constant diameter section and increases in diameter with increasing distance from said end surface, said central opening and said first and second conical surfaces and said constant diameter surface having a common center axis, and said first conical surface extending at a greater angle to said center axis than said second conical surface;

at least one port for admitting a pressurized assist gas into said passageway for discharge via said outlet orifice, whereby said pressurized assist gas and said laser beam gas may be directed simultaneously at a selected workpiece; and a conical outer surface surrounding and extending from the outer periphery of said end surface, said conical outer surface increasing in diameter with increasing distance from said annular end surface, whereby to enhance dispersion of high velocity pressurized assist gas discharged from said outlet orifice radially outward and away from said nozzle and said workpiece.

26. A laser nozzle according to claim 25 wherein said first conical surface extends at an angle of about 63.6° relative to said center axis.

* * * * *

UNITED STATES PATENT AND TRADEMARK OFFICE
CERTIFICATE OF CORRECTION

PATENT NO. : 6,423,928 B1
DATED : July 23, 2002
INVENTOR(S) : Bernhard P. Piwczyk It is certified that error appears in the above-identified patent and that said Letters Patent is hereby corrected as shown below:

Column 11,
Line 11, insert "so" before -- that --;

Column 12,
Line 5, delete "said"; and
Line 27, insert the numeral -- 8 -- after "claim".

Signed and Sealed this

Nineteenth Day of November, 2002

Attest:

Attesting Officer

JAMES E. ROGAN
Director of the United States Patent and Trademark Office